May 3, 1932. S. D. LOCKE ET AL Re. 18,450

LUBRICATING APPARATUS

Original Filed Feb. 28, 1922 4 Sheets-Sheet 1

Inventors
Sylvanus D. Locke
Charles R. Dosch

By Williams, Bradbury, McCaleb & Hinkle
Attys.

May 3, 1932. S. D. LOCKE ET AL Re. 18,450
LUBRICATING APPARATUS
Original Filed Feb. 28, 1922 4 Sheets-Sheet 2
Fig. 2.
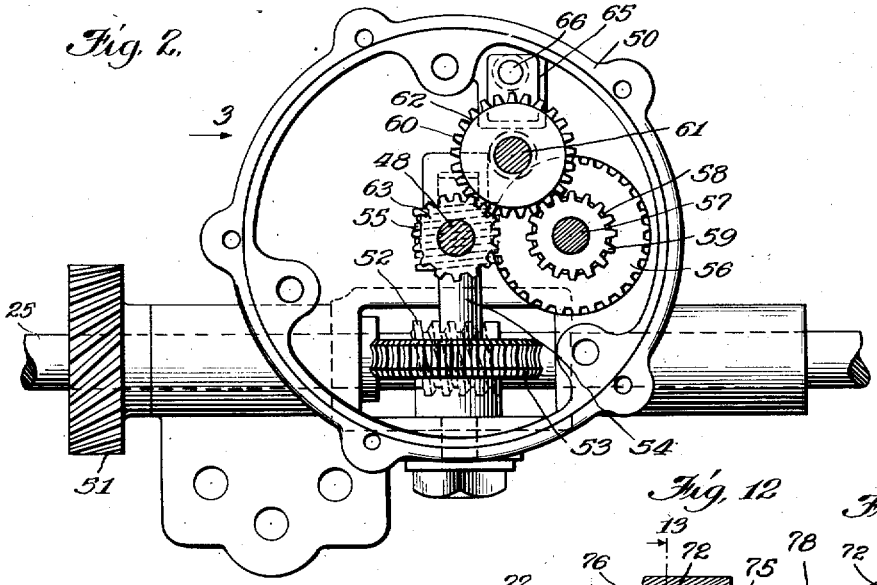
Fig. 12
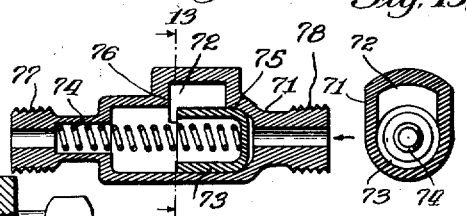
Fig. 13.
Fig. 3.
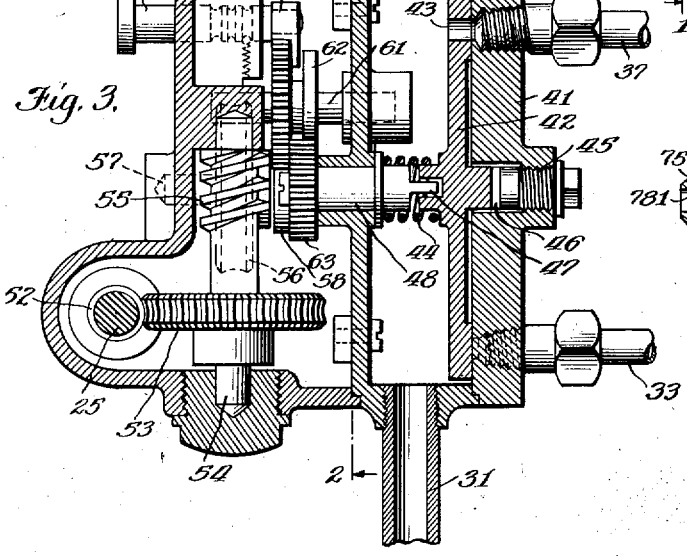
Fig. 14.
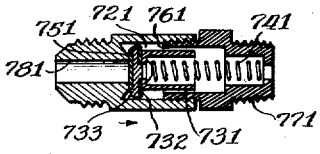
Inventors
Sylvanus D. Locke
Charles R. Dosch
By Williams, Bradbury, McCaleb & Hinkle
Attys.

May 3, 1932. S. D. LOCKE ET AL Re. 18,450

LUBRICATING APPARATUS

Original Filed Feb. 28, 1922 4 Sheets-Sheet 3

Inventors
Sylvanus D. Locke
Charles R. Dosch
By William, Brad'bury, McCaleb & Hinkle
Attys.

May 3, 1932. S. D. LOCKE ET AL Re. 18,450

LUBRICATING APPARATUS

Original Filed Feb. 28, 1922 4 Sheets-Sheet 4

Inventors
Sylvanus D. Locke
Charles R. Dosch
By Williams, Bradbury, McCaleb & Hinkle
Attys.

Reissued May 3, 1932 Re. 18,450

UNITED STATES PATENT OFFICE

SYLVANUS D. LOCKE, OF BRIDGEPORT, AND CHARLES R. DOSCH, OF STRATFORD, CONNECTICUT, ASSIGNORS, BY MESNE ASSIGNMENTS, TO ALEMITE CORPORATION, OF CHICAGO, ILLINOIS, A CORPORATION OF DELAWARE

LUBRICATING APPARATUS

Original No. 1,542,311, dated June 16, 1925, Serial No. 540,000, filed February 28, 1922. Application for reissue filed June 10, 1927. Serial No. 197,948.

Our present invention relates to a lubricating apparatus for mechanism, and more particularly for motor vehicles.

One of the objects of our invention is to provide an arrangement by which all parts of a vehicle requiring lubrication may be automatically lubricated in accordance with the need of each bearing.

Another object of our invention is to provide a means by which a bearing may be lubricated automatically and intermittently and preferably by a predetermined amount of lubricant supplied at predetermined intervals.

Another object of our invention is to provide a means by which oil may be conveyed from one part of a motor vehicle to another where such parts are relatively movable, without danger of breakage of the oil-conveying pipes.

Another object of our invention is to provide a means by which a quantity of oil may be supplied to a branched pipe, the branches of which lead to different bearings, and by which each bearing will obtain its required amount of lubricant from the common supply pipe.

With these and other objects in view, our invention consists of the construction and arrangement of parts hereinafter described and more fully pointed out in the appended claims.

In the drawings,

Fig. 2 is an elevation of an illustrative form of distributer valve which may be used in carrying out our invention, Fig. 2 being a section of Fig. 3 on the line 2—2.

Fig. 3 is a vertical central section of Fig. 2 looking in the direction of the arrow 3.

Figs. 4 and 5 are, respectively, elevation and plan of the combination of intermittently and continuously moving gearing shown in Figs. 2 and 3, with the gearing arranged as for the normal operation of our device.

Figs. 6 and 7 correspond to Figs. 4 and 5, with the intermittent gearing thrown out of operation and continuous gearing substituted therefor.

Figs. 8 and 9 correspond to Figs. 4 and 5, but with the gearing thrown entirely out of operation.

Figure 1:
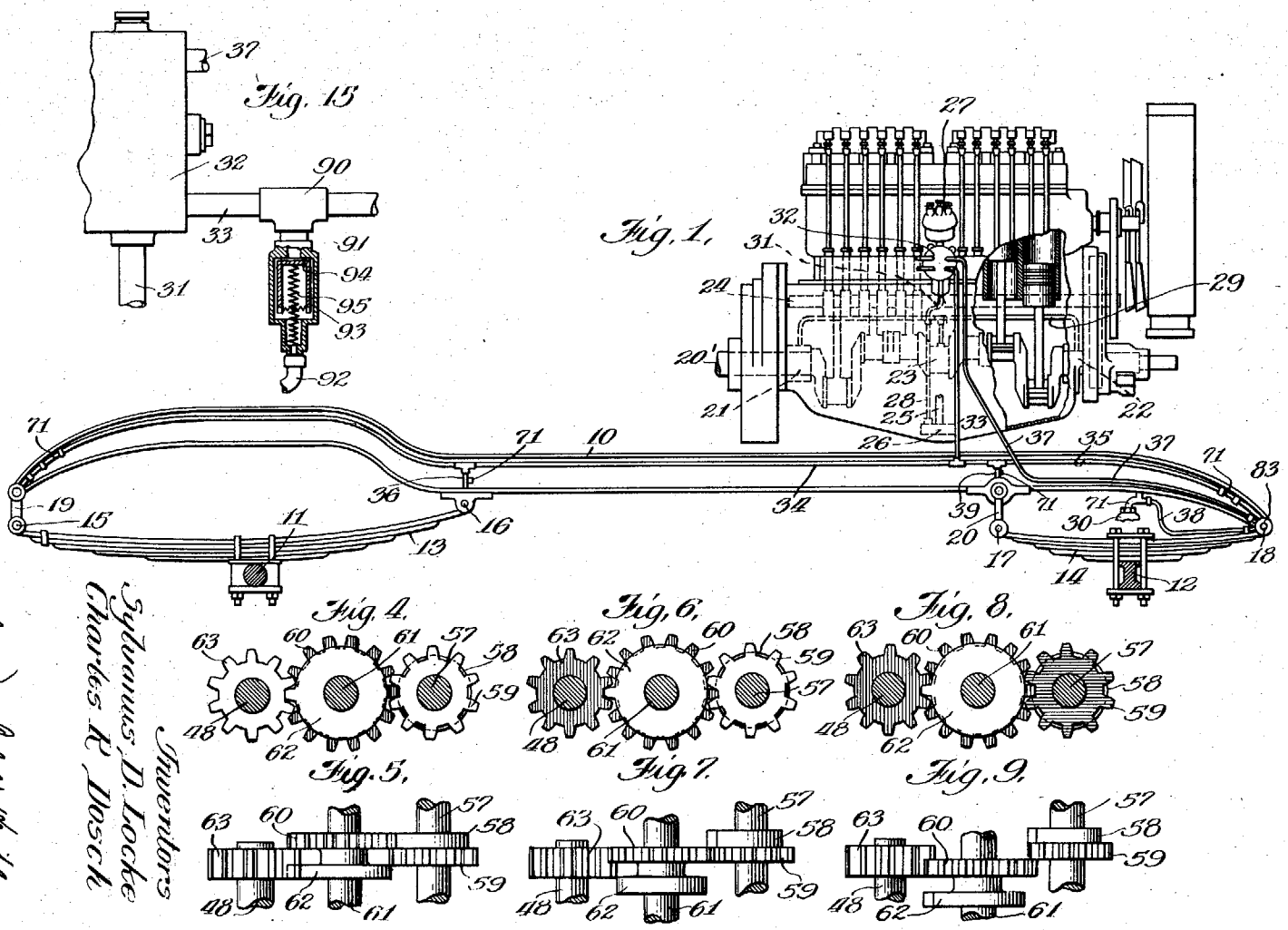
Fig. 1 is a side elevation of a part of an automobile which we have adopted to illustrate one form of our invention, showing in more or less diagrammatic form a part of the chassis and of the engine, the engine being shown above its normal position for the sake of clearness.
Figure 10:
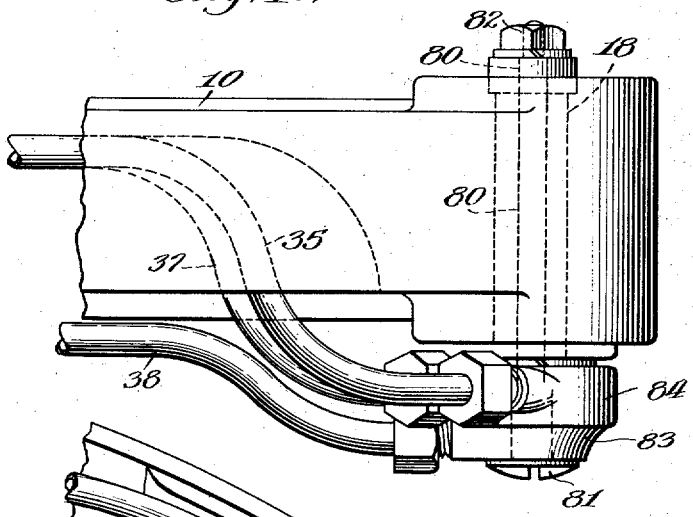
Figure 11:
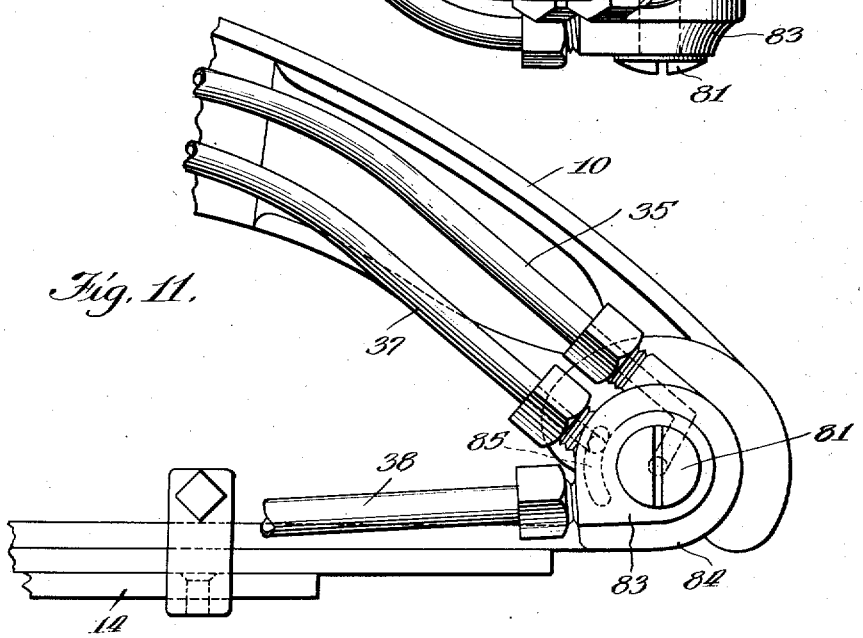

Figs. 10 and 11 are enlarged plan and elevation, respectively, of a portion of Fig. 1, showing an illustrative method by which lubricant may be conveyed between relatively movable parts of the vehicle without danger of breaking the piping.

Fig. 12 is a longitudinal section showing one illustrative form of measuring device.

Fig. 13 is a vertical section on the line 13—13 of Fig. 12.

Fig. 14 is a longitudinal section of another illustrative form of measuring device.

Fig. 15 is a view partly in section, of a pressure relief valve.

Figure 16:
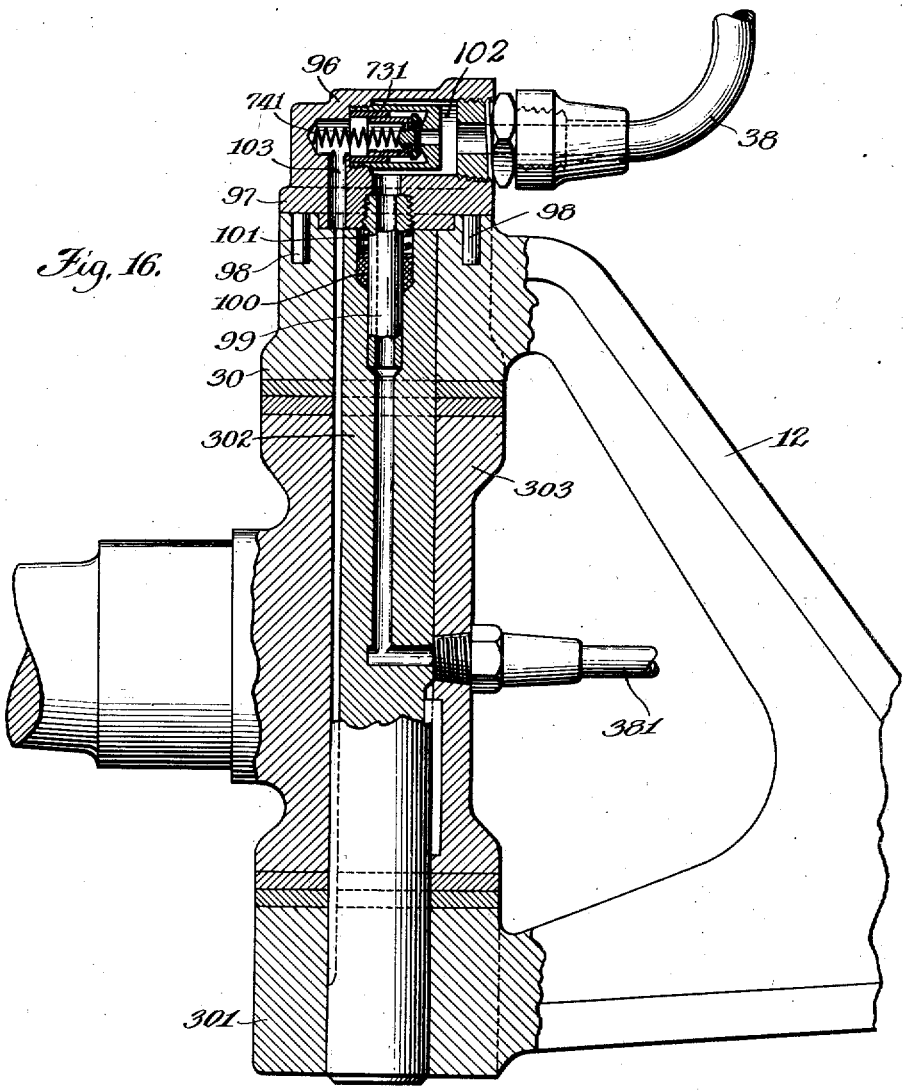
Figure 17:
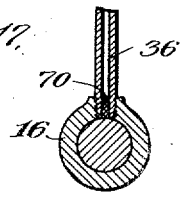

Fig. 16 illustrates a method of oiling a vehicle steering knuckle and parts located near it, without danger of breaking pipes, and Fig. 17 is a detail.

In the drawings, corresponding parts have corresponding characters.

As an illustration of one form in which our invention may be applied, we have shown it in connection with an automobile of a known type, in which 10 is a side bar or member shown as having a channel section, as is usual, and 11 and 12 are, respectively, the rear and front axles or parts which ultimately carry the weight of the vehicle to the wheels. Between the parts 11 and 12 and the side member 10 are the usual springs 13, 14, connected by shackle bolts 15, 16, 17 and 18, all as usual, the shackles 15 and 17 being connected with pins attached to the frame 10 by the links 19, 20. On the frame 10 is carried a gas engine of any of the well known types, and which generally is suspended on the side frames, so that the center line of its crank shaft extends just above the axle 12. In Fig. 1, however, in order to clarify the disclosure, the engine is shown above its normal position. In the form of the engine which we have adapted for purposes of illustration, 20′ is a crank shaft extending along the engine base and having rear bearing 21, front bearing 22, and middle bearing 23. Driven through suitable gearing is a cam or timing shaft 24, which, in the form illustrated, is provided at its central portion with a spiral gear (not shown) which drives a vertical shaft 25 (broken away for sake of clearness) through a spiral gear 51 (Fig. 2) thereon. At the lower end of this vertical shaft is a rotary oil pump 26, and at its upper end is the usual ignition timing device 27.

All of the parts thus far described are old in the art and further description will be unnecessary to a correct understanding of our invention.

The shackle-bolts connecting the springs 13, 14 with the side frames, as well as other bearings, such as the steering knuckles and links, valve rocker arms and the like, require a relatively small amount of lubricant at relatively long intervals, since the motion of the parts carried thereon is comparatively small. Nevertheless, some lubrication is required, and heretofore it has been the usual practice to lubricate each of these bearings separately by applying the lubricant directly to them whenever the user of the machine deemed it necessary. This non-automatic lubrication results in frequent neglect, and is, in any event, a task avoided, if possible, by the user of the vehicle.

It has been the usual practice to flood the bearings of the crank-shaft and sometimes of other parts of the engine with lubricant carried in the base of the engine, the pump 26 supplying a continuous stream through a pipe 28 to a horizontal branched pipe 29, and from thence to the continuously running crank-shaft bearings. The surplus oil falls back to the bottom of the crank-casing from which it is pumped up again by the pump 26. In the arrangement which we have chosen for purposes of illustration, we use the pump 26 as a source of supply for the lubrication of the shackle-bolts and for any other parts of the vehicle which require only a relatively small amount of lubrication, such as the steering knuckle, one of which is illustrated at 30, the rocker arms for overhead valve engines and the like. It is obvious, however, that since the pump 26 is supplying a continuous stream of oil to the motor bearings, an apparatus must be provided to modify this supply so as to adapt it to lubricate the parts just referred to. As an illustrative form of our invention, we provide a pipe 31 in continuation of the pipe 28 and extending through the motor casing to a valve mechanism, which we designated generally in Fig. 1 by the character 32, which valve mechanism, as will be more fully explained hereinafter, is operated, in the illustrative form of our invention, by the vertical shaft 25. From the valve mechanism 32 leads one or more pipes which connect through suitable branches with the several bearings to be lubricated. For instance, a pipe 33 extends to horizontal pipes 34 and 35 supported in the side frame 10. The pipe 34 through pipe 36 communicates with the shackle-bolts 16 and directly with the pin supporting the member 19 through which the lubricant may be carried directly to the shackle-bolt 15. Similarly, pipe 35 leads to the shackle-bolt 18. A second pipe 37 also extends from the valve 32 to an arrangement at the front end of the frame 10, which will be more specifically described hereinafter, and from thence a pipe 38 extends to the steering knuckle 30. A branch 39 connects the pipe 35 with the supporting pin over the link 20 and from thence the lubricant will flow to the shackle-bolt 17. Similar pipes will connect the valve 32 with any other bearings it is desired to lubricate.

In the form illustrated, we arrange the valve 32 so that the several lubricant feed pipes will be connected to the oil supply pump 26 at definite intervals, which ordinarily will be relatively widely spaced apart in time. One form of such valve mechanism, which may be used in connection with our invention, is shown in enlarged view in Figs. 2 and 3, in which 40 is a valve casing having a cover 41 through which extend the pipes 33 and 37, and as many more as may be desired to supply different bearings to be lubricated. In the casing 40 is a valve plate 42 having one or more openings 43 arranged to pass over the entrances to the pipes 33, 37 and held against the cover 41 by a spring 44. A screw plug 45 is arranged so that by screwing it inward, it will press against the pivot 46 of the plate 42 and lift the plate from its contact with the cover 41 when it is desired to lubricate several bearings simultaneously, or to clean the pipes or the like.

The valve plate 42 is rotated by a tongue 47 engaging in a groove in the valve plate 42 and carried on the end of a shaft 48 supported in a bearing in the casing 40. The pipe 31 extends into one side of the chamber in the casing 40 to supply the lubricant thereto from the pump 26, and it will be seen that when the opening 43 registers with any one of the lubricating pipe openings, the pressure from the pump 26 will be transmitted, through the pipe 31 and the casing 40, into the pipe for so long as the opening 43 is opposite the pipe opening. In the form illustrated, the plate 42 is rotated by the engine, so that the oil supply to the several bearings will be governed by the approximate distance travelled. At the rear of the casing 40 is a casing 50 which carries suitable gearing to connect the engine with the valve plate 42. On the shaft 25 is a spiral gear 51 engaging with a corresponding gear on the cam shaft 24 of the engine, this shaft 25 being carried through suitable bearings in the casing 50 and extending to the ignition timing device in the form illustrated in the drawings. On the shaft 25 is a worm 52 engaging with a worm gear 53 carried by a vertical shaft 54 supported in the casing 50. A second worm 55 is mounted on the shaft 54 and meshes with a worm gear 56 on a horizontal shaft 57. While these worms and gears considerably reduce the speed of the shaft 57 in comparison with the speed of the engine shaft, yet it will be obvious to those skilled in the art that if this gearing were directly connected to the plate 42, the several bearings would be lubricated at too frequent intervals. Preferably, therefore, we introduce between the shaft 57 and the plate 42 broken or intermittent gearing, which will still further considerably increase the ratio between the turns of the engine and of the plate 42 and yet which will cause the plate 42 to turn with a relatively high velocity when the opening 43 is passing the end of one of the lubricating pipes, so as not to prolong unduly the time during which pressure is applied from the valve chamber to the pipe. As an illustrative form of such broken gearing, we have shown a single toothed gear 58 attached to shaft 57 and beside it a spur gear 59. The single toothed gear 58 engages with the tooth of the spur gear 60 on an idler shaft 61, the hub of the gear 60 having attached to it a single toothed gear 62 which engages with a wide faced gear 63 connected to the shaft 48 through which the plate 42 is driven by the tongue 47. The relative arrangement of these gears is best shown in Figs. 4 and 5 where the shafts have been shown as in the same plane, although in the form illustrated, the shaft 61 is actually at one side of the plane of the shafts 48 and 57. As a convenient means of locking gears 60 and 63 against rotation, except when the single teeth of gears 58 and 62 are engaging therewith, the body portions of gears 58 and 62 may be provided with circular portions arranged to contact with the extreme edges of the teeth on gears 60 and 63, as shown in Figs. 4, 6 and 8.

With the shaft 25 continuously rotating, the shaft 57 is also continuously rotated, but at a relatively low rate of speed by reason of the worm and worm gears between the two shafts. The shaft 48, and with it the plate 42, is given an intermittent or step by step motion at prolonged intervals and only when the single toothed gear 62 engages with the gear 63. This engagement does not occur, of course, until the single toothed gear 58 has made a sufficient number of turns to rotate the gear 60 once. By proper proportion of the parts, however, the opening 43 may be made to pass entirely across the entrance to one of the oil pipes during the time of engagement of the single tooth of the gear 62 with the gear 63, and since, at that time, the single tooth of gear 58 is also engaged with the gear 60, there is, for that interval only, a substantially continuous gear connection between the plate 42 and the engine shaft. Thus the time of opening of the valve 43 may be relatively short and yet the valve plate 42 be so moving that the total time for it to make one rotation may be exceedingly long. Our combination of continuous and intermittent reduction gearing, therefore, does not merely reduce the speed of the valve plate 42 in relation to the engine shaft, but it gives the valve plate 42 a motion which is peculiarly useful in carrying out the illustrated form of our invention.

The gears 60, 62 are freely rotatable on the shaft 61 and may also be slid longitudinally thereof from the position shown in Fig. 5 to those shown in Figs. 7 and 9, this sliding being accomplished by a tongue member 65 on the end of a longitudinally movable stud 66 extending through the casing 50, this stud being held in any one of three adjusted positions by means of a spring-held ball ratchet of any well-known type, the ball engaging in suitable grooves in the stud 66. In Figs. 3, 4 and 5, the gearing is shown in the position in which it will be during the normal operation of our device, but if it is required to cut out the operation of the intermittent gearing, as may be desired under some circumstances, the stud 66 is moved to its central position, this carrying the gearing to the position shown in Fig. 7 so that the plate 42 will be continuously rotated, thus greatly shortening the intervals between the lubrications of the bearings. A further motion of the stud 66 will move the gear to the position shown in Fig. 9, which completely disconnects the plate 42 from the engine shaft in the event that it is desired to suspend the automatic lubrication of the bearings.

At each rotation of the valve plate 42 and during the time the opening 43 registers with the end of the pipe 33, the pump 26 will be directly connected to the pipes 34 and 35 through the common supply pipe 33, and oil under pressure will, therefore, be forced or attempted to be forced into the pipes 34, 35 and from them into the bearings connected therewith. Similarly, when opening 43 registers with the end of pipe 37, oil will be forced to the bearings to which it leads. In some instances, it will be sufficient to prevent the flooding of the bearing to provide a flow retardant in each branch, such a retardant being illustrated in Fig. 17 in which a plug, as a cotton wicking 70, is inserted in the pipe 36 leading to the bearing 16, and preferably so as to be in contact with the bearing itself.

For greater certainty in the supply of the lubricant to each bearing, however, we preferably provide a means adjacent each bearing to control the amount of lubricant passing to the bearing or by which a measured quantity of lubricant will be supplied to the bearing each time that the distributer valve is open.

One form of such a means we have illustrated in the arrangement shown in Figs. 12 and 13 in which a body member 71, which may be connected in the line of piping, preferably adjacent the bearing to be lubricated, has formed therein a laterally disposed chamber 72. Within the central cavity of the member 71 is a sliding valve 73 normally held in the position shown in Fig. 12 by a spring 74. The valve 73 is so arranged in relation to the chamber 72 and its connection with the central cavity of the body member 71, that the valve 73, in effect, works between two valve seats, one of which may be designated as the portion 75 of the member 71 and the other as the portion 76 of the member 71. It will be seen that, in the position shown in the drawings, the valve 73 is seated against valve seat 75, so as to close the pipe against the flow of fluid in the direction of the arrow in Fig. 12 until the pressure of such fluid is great enough to overcome the pressure of the spring 74. When the valve is in this position, it is above the seat 76, so as to connect the chamber 72 with the central cavity. This would permit any fluid in the chamber 72 to flow out into the central cavity and finally out of the end 77. When the valve 73 is moved to the left of Fig. 12, however, so that it seats itself against the seat 76 by sliding longitudinally in the central cavity, the valve illustrated is long enough to first cut off the chamber 72 from all connection with the central cavity and finally, by the further motion to the left of the valve 73, to open the chamber 72 to the end 78 of the valve body, thus permitting fluid to flow from the end 78 into the cavity 72.

In practice, we preferably provide a measuring or control valve adjacent the bearing to be lubricated and so that the central cavity thereof constitutes a part of the pipe conveying lubricant to the bearing. In the illustrative form of our invention, all or a portion of the lubricating pipes will be filled at all times with lubricant.

When the form of valve shown in Fig. 12 is used, the spring 74 will be so designed as to form a sufficient resistance to the weight of the column of lubricant in the supply pipe to prevent the valve being moved from the position shown in Fig. 12, except when the valve 32 is open. Then the pressure of the pump 26 will cause the valve 73 to move to the left of Fig. 12 and the lubricant to be forced into the chamber 72. It cannot be forced beyond this chamber, however, at this time, because the valve 73 is also closed against seat 76 to prevent egress through the end 77. When the valve 32 is closed and the pump pressure on the lubricant ceases, then the spring 74 returns the valve to the position shown in Fig. 12, thus simultaneously permitting the lubricant in the chamber 72 to flow out through the end 77, and at the same time, preventing any lubricant from flowing through the end 78 and the pipe connected therewith into the chamber 72.

In Fig. 14, we have illustrated another form of measuring or control valve which may be used instead of the form illustrated in Figs. 12 and 13. In this form, the body portion is made up of the parts 771 and 781 screwed together. The part 781 has a chamber 721 in which is slidingly mounted a cylindrical member 731 having at its left-hand end two valve discs 732 and 733. A spring 741 holds the disc 733 against the valve seat 751. The disc 732, when the valve moves to the right of Fig. 14, is pressed against the valve seat 761. Preferably, there is a clearance space between the perimeter of the disc 732 and the wall of the chamber 721 and also between the valve body 731 and the opening in the part 771 in which it slides.

In Fig. 14, the lubricant flows in the direction of the arrow and so long as there is no pump pressure on the lubricant in the pipe connected to the part 781, the disc 733 is held closed by the spring 741 to prevent the lubricant flowing to the adjacent bearing. When the pump pressure is applied, the pressure rises until the resistance of the spring 741 is overcome. As soon as the disc 733 leaves its seat, the area of the disc subject to pressure is greatly increased, because, as will be noted, the area under pressure before the disc leaves its seat is the area of the opening in the member 781, whereas, after it leaves its seat, the area subject to pressure is substantially that of the disc 732. This change of area and consequent increase of effective working force causes the valve 731 to move quickly to the right of Fig. 14 to bring the disc 732 against the seat 761. If any of the lubricant flows around the disc 732 after disc 733 leaves its seat and before disc 732 is against its seat 761, the pressure from the left of Fig. 14 will be partially balanced, but because of the relatively large area of the valve body 731, such counterpressure is insufficient to prevent the quick opening of the valve. After the disc 732 is against its seat, the chamber 721 is filled with lubricant but egress to the bearing is shut off.

When the pump pressure is cut off and the pressure in the chamber 721 falls, the spring 741 moves the valve to the left of Fig. 14, the clearance around the disc 732 permitting the valve to move through the chamber 721 and the disc 733 is seated against the seat 751. The motion of the valve to the left in Fig. 14 is also accelerated after the disc 732 leaves its seat 761, because the pressure on the disc 733 is then partially balanced by the pressure on the area of the disc 732 outside of the valve body 731 from the lubricant which passes around the perimeter of the disc 732. The lubricant in the chamber 721 passes through the clearance space around the valve body 731 and so to the bearing to be lubricated.

The form of valve illustrated in Fig. 14 is particularly adapted for use where it is desired to deliver a very small quantity of lubricant and where the pump pressure available is relatively low or variable between relatively wide limits. The pressure must be sufficient, of course, to overcome the resistance of the spring 741, but once that pressure is overcome, the valve moves with great rapidity to the right of Fig. 14, so that the possibility of oil under pressure flowing directly to the bearing while the valve 733 is open and before the valve 732 is closed is practically eliminated. The quantity delivered is only the amount in the chamber 721, and this is obviously much smaller than that contained in a separate chamber, as in the form illustrated in Figs. 12 and 13. The measuring of the amount delivered is also more accurately performed under variable conditions by the form of valve shown in Fig. 14 than by the form shown in Fig. 12.

It will be understood by those skilled in the art that the form of the measuring valve may be widely varied. The simple forms which we have chosen for illustrative purposes are relatively inexpensive to manufacture, and sufficient for our purposes.

We have found that, when the master valve 32 closes, the pressure in the pipes leading therefrom does not drop immediately, as it should theoretically, and to overcome the delay in supplying the lubricant to the bearings which this would cause, we preferably provide a relief valve in each pipe leading from valve 32, one form of which is illustrated in Fig. 15. A T 90 is inserted in the pipe and a valve body 91 attached thereto, a pipe 92 eading from the valve body 91 back to the lubricant reservoir. In the valve body 91 is a valve 93 held against a seat 94 by a spring 95. The lower end of the valve 93 is notched so that egress to the pipe 92 is not closed when the valve is moved away from its seat 94. When the valve 32 is opened, the pressure in the pipe will open the valve 93 and permit lubricant to flow around the valve and into the pipe 92 back to the reservoir. When the valve 32 closes, the lubricant continues to flow from the pipe past the valve 93 until the pressure drops sufficiently to permit the small valves adjacent the bearings to close. Preferably, we make the area of the valve 93 larger than the corresponding areas of the valves adjacent the bearings, to insure the closing of the latter before the valve 93 closes, since, by this arrangement, a pressure which will permit the smaller valves to close will still be sufficient to hold the valve 93 open. By the use of such relief valves, the pressure in the pipes will drop as soon as the valve 32 is closed.

As has been stated above, there are some bearings of a motor vehicle which move bodily in relation to the frame and the motor and if the oil pipe were run directly from the frame portion of the chassis to such a bearing, such a pipe would be subjected to constant bending and distortion, which might ultimately cause it to break.

As one means of avoiding this, we have illustrated in Figs. 10 and 11, an arrangement for lubricating a steering knuckle, although it will be understood that it may be applied to any similarly disposed bearing. As shown best in the enlarged views, Figs. 10 and 11, the bearing pin 18 carried in the frame 10 is, in the illustrative form, provided with a pin 80 extending therethrough and having a head 81 at one end and a nut 82 with a lock washer at the opposite end. Between the head 81 and the body of the bearing pin 18 are provided a pair of cylindrical members 83, 84, each having a flat face, the two flat faces being held together by the pressure of the nut 82 and the spring washer beneath it. Preferably, the member 84 is fastened to the bearing pin 18 or to the frame 10, so as to be relatively immovable, and the member 83 is permitted to turn in relation to 84. In the arrangement shown, the pipe 35 conducts the lubricant through a suitable channel in the member 84, and from thence through other suitable channels to the bearing surface of the bearing pin 18. Into another portion of the member 84 is connected the pipe 37 which communicates with an opening terminating in the flat face of the member 84. In the flat face of the member 83 is a channel or groove 85 arranged to communicate at all times with the end of the pipe 37, which groove, in turn, communicates through suitable openings in the member 83 with a pipe 38 leading directly to the bearing 30 through one of the measuring valves 71. The length of the groove 85 is sufficient to take care of the rotation of the member 83 in relation to the member 84, which rotation is caused by the yielding of the spring 14. The spring washer under the nut 82 will ordinarily provide sufficient pressure between the flat faces to form an oil-tight joint, but it will be understood that other means may be provided to this end, and indeed, if desired, the two relatively rotatable parts 83, 84 may be made so that one surrounds the other instead of being in alignment, as illustrated.

As another form of swivel device by which the bending of the lubricant supply pipes is prevented, we illustrate in Fig. 16 an arrangement in which the swivel formed by the steering knuckle itself is utilized. In this arrangement, the axle 12 has bearings 30 and 301 supported in which is the king pin 302 to which is keyed the movable member 303 carrying the wheel axle and to which are attached the usual steering arms, all as in the usual construction.

At the top of the bearing 30 is a member 96 to which is connected the supply pipe 38. The member 96 is provided with a plate 97 pinned to the bearing 30 by pins 98 to hold it against rotation and a pipe 99 connected to the member 96 enters a central hole in the king pin 302, from which a channel leads to a pipe 381 which, in turn, leads to the steering connections which move with the knuckle 303. Suitable packing 100 held by a spring 101 makes an oil-tight joint. The pipe 99 opens into a chamber 102 in the member 96 which is connected directly with the supply pipe 38, so that lubricant can flow directly from the pipe 38 through pipes 99 and 381 to the steering connections. The swivel between the fixed member 96 and the moving parts of the steering apparatus is therefore the connection between the pipe 99 and the king pin 302 and the pipe 381 can move relatively to the pipe 38 while neither of the pipes is subjected to bending. The pipe 381 will be provided with valves, such as are shown in Figs 12 and 14 adjacent the joints to be lubricated.

Preferably, we combine with the arrangement just described, a valve to control the lubrication of the king pin itself. In the form illustrated, a valve similar to that shown in Fig. 14 is mounted in the member 96 and a duct 103 leads from the rear of the valve to the longitudinal lubricant duct of the king pin. As hereinbefore described, lubricant for the king pin will be supplied for each alteration of pressure in the supply pipe 38.

With the parts arranged as shown in the drawings, and the engine in motion, lubricant will be supplied continuously to some of the bearings, and particularly to the shaft bearings of the engine. The gearing connected to the valve 32 will also be moved, but by reason of its character will rotate the valve plate 42 relatively slowly, so as to open the valve 32 only after a predetermined number of turns of the engine. If the machine has been in use previously, the several pipes will be filled with lubricant, none of which can pass to the respective bearings, however, because of the control valve adjacent each bearing. When in the course of the turning of the plate 42, one of the openings 43 registers with the end of one of the pipes, then the pump pressure is transmitted to the lubricant in the pipes, causing each measuring or control valve in that line to operate as hereinbefore described, to deliver lubricant to its bearing. If desired, wicking 70, such as shown in Fig. 17, may be inserted in the tube between the measuring valve and the bearing, to prevent the forcing of lubricant directly into the bearing as might be the case with any lubricant remaining in the measuring valve after its previous operation. For instance, if, after disc 733 in Fig. 14 was seated, the lubricant in the chamber 721 did not flow into the bearing, the next application of pressure would shoot the valve to the right of Fig. 14 and force any lubricant remaining in chamber 721 directly into the bearing, which might be undesirable. The presence of the wicking would prevent this.

While we prefer to use the lubricant in the engine base as a source of supply, it will be understood that a separate reservoir may be used for the supply to the intermittently lubricated bearings. It will also be understood that the form of the distributer valve may be varied within wide limits and may be of any of the known types other than the rotary valve which we have chosen for purposes of illustration. It will also be understood that, if desired, individual pipes may be run from the distributer valve to each bearing, but preferably we provide a branched system to economize in tubing. In such case, because of the measuring valve adjacent each bearing, it will be obvious that each bearing will receive its proper amount of lubricant, which would not be the case if a branched system were used without some control means for each branch; in the latter case, lubricant delivered to the main pipe would be liable to flow into one of the branches and not into the others or to divide between the several branches without regard to the needs of the bearings connected to the respective branches.

While, preferably, we arrange our system so that the pump or other feed pressure is applied to the lubricant in the piping at relatively short intervals, it will be understood that the reverse operation could be provided. That is to say, the valve could be so arranged, by forming opening 43 as a long circular slot, so that the pressure on the lubricant would continue for a greater time than the period in which it is relieved. The presence of the measuring valve would prevent the lubricant from being forced into the bearings, and the alternation between the application and relief of pressure would cause the measuring valves to operate as described. In other words, with our system, it is immaterial whether the lubricant is normally under pressure or not, so long as there is an alternation between a condition of pressure and no-pressure in the pipes.

While, preferably, we form the chamber of the measuring valve as part of the valve body, it is obvious that it may be provided by a suitable pipe acting as a by-pass around a double valve arranged to close one end of the chamber when the other end is open.

While we have illustrated the pressure pump as being driven directly from the engine, it will be understood that it may be driven from parts which are driven by the engine but which are disconnected from the engine when the vehicle is not in motion. It will also be understood that the pressure may be supplied by a pump other than the one used for lubricating the engine.

While we have illustrated and described our invention as it would be applied to a motor vehicle, it will be understood that it may be applied to other kinds of machines, and furthermore that some parts of our invention may be used independently of other parts thereof.

We claim:—

1. A lubricating system for machine bearings, comprising a lubricant reservoir, connections, including a conduit, from the reservoir to a bearing to be lubricated, mechanism for intermittently producing and relieving pressure on the lubricant in the conduit and a valve mechanism in said conduit comprising a valve body having an inlet and an outlet port, a valve for each port, connected so that when one valve is open the other is closed, and a spring arranged to hold the inlet valve normally closed and the outlet valve open, said inlet valve and its seat being arranged to provide an increase in the valve area subjected to pressure when the inlet valve is moved from its seat.

2. A lubricating system for machine bearings, comprising a lubricant reservoir, connections, including a conduit, from the reservoir to a bearing to be lubricated, mechanism for intermittently producing and relieving pressure on the lubricant in the conduit and a valve mechanism in said conduit comprising a valve body having an inlet and an outlet port, a valve for each port connected so that when one valve is open the other is closed, and a spring arranged to hold the inlet valve normally closed and the outlet valve open, the area of the inlet valve being larger than the area of the inlet port, whereby the total pressure against the spring is increased when the inlet valve is moved from its seat.

3. A lubricating system for machine bearings, comprising a lubricant reservoir, connections, including a conduit, from the reservoir to a bearing to be lubricated, mechanism for intermittently producing and relieving pressure on the lubricant in the conduit and a valve mechanism in said conduit comprising a valve body having an inlet an an outlet port, a valve for each port connected so that when one valve is open the other is closed, and a spring arranged to hold the inlet valve normally closed and the outlet valve open, said inlet valve and its seat being arranged to provide an increase in the valve area subjected to pressure when the inlet valve is moved from its seat, and said outlet valve and its seat being arranged to provide a decrease in the fluid pressure on the valve when the valve is moved from its seat.

4. A lubricating system for machine bearings, comprising a conduit connecting a source of lubricant supply with a bearing, means for applying and relieving pressure intermittently on the lubricant in said conduit, an inlet and an outlet valve in said conduit, and yielding means to hold the inlet valve closed and the outlet valve open during the period of low lubricant pressure and to permit the inlet valve to be opened and the outlet valve closed by an increase of pressure on the lubricant, each of said valves being arranged to move at a greater speed after being unseated than the speed at which they are unseated.

5. In a lubricating system for machine bearings, a conduit, means for increasing and decreasing pressure on the lubricant in said conduit and a measuring valve in said conduit, comprising a valve body having a chamber therein, an inlet port and an outlet port in said chamber, a member in said chamber and arranged to move between the inlet port and the outlet port and to form a poppet valve to close said ports alternately with each increase and decrease of pressure on the lubricant in the conduit, and a spring arranged to hold said member against said inlet port when the lubricant pressure is low.

6. In a lubricating system for machine bearings, a conduit, means for increasing and decreasing pressure on the lubricant in said conduit and a measuring valve in said conduit, comprising a valve body having a chamber therein, an inlet port and an outlet port in said chamber, a member in said chamber and arranged to move between the inlet port and the outlet port and to form a poppet valve to close said ports alternately with each increase and decrease of pressure on the lubricant in the conduit, and a spring arranged to hold said member against said inlet port when the lubricant pressure is low, the area of said member subject to pressure of the lubricant in said conduit being considerably greater when the inlet port is opened than when it is closed.

7. In a lubricating system for machine bearings, a conduit, means for increasing and decreasing pressure on the lubricant in said conduit and a measuring valve in said conduit, comprising a valve body having a chamber therein, an inlet port and an outlet port in said chamber, a member in said chamber and arranged to move between the inlet port and the outlet port and to form a poppet valve to close said ports alternately with each increase and decrease of pressure on the lubricant in the conduit, and a spring arranged to hold said member against said inlet port when the lubricant pressure is low, the area of said member subject to pressure of the lubricant in said conduit being considerably less when the member is against either the inlet or the outlet port than when the member is between said ports.

8. In a lubricating system for machine bearings, a conduit, means for increasing and decreasing pressure on the lubricant in said conduit and a measuring valve in said conduit, comprising a valve body having a chamber therein, an inlet port and an outlet port at opposite ends of said chamber, a member having a cylindrical portion freely sliding through said outlet port and a valve head on one end of said cylindrical portion, said valve head being arranged to move between said ports to form a poppet valve to close the port with which it is in contact, said valve head having its edges spaced from the walls of said chamber and being considerably larger in area than the area of either of said ports, and a spring to hold the valve head normally against the inlet port.

9. In a lubricating system for machine bearings, a conduit, means for increasing and decreasing pressure on the lubricant in said conduit and a measuring valve in said conduit, comprising a valve body having a chamber therein, an inlet port and an outlet port in said chamber, a member in said chamber, and arranged to move between the inlet port and the outlet port and to form a poppet valve to close said ports alternately with each increase and decrease of pressure on the lubricant in the conduit, and a spring arranged to hold said member against said inlet port when the lubricant pressure is low, the area of said member subject to pressure of the lubricant in said conduit being considerably greater when the inlet port is opened than when it is closed, the area of said member subject to the pressure of the lubricant and said spring being proportioned relatively so that the pressure of said spring on said member is exceeded by the pressure of the lubricant on said member at all times while said member is moving from the inlet port to the outlet port.

10. In a lubricating system for machine bearings, a conduit, means for increasing and decreasing pressure on the lubricant in said conduit and a measuring valve in said conduit, comprising a valve body having a chamber therein, an inlet port and an outlet port in said chamber, a member in said chamber and arranged to move between the inlet port and the outlet port and to form a poppet valve to close said ports alternately with each increase and decrease of pressure on the lubricant in the conduit, and a spring arranged to move said member away from said outlet port and against said inlet port when the lubricant pressure drops, the area of said member subject to the pressure of the lubricant and said spring being proportioned relatively so that the pressure of said spring on said member exceeds the pressure of the lubricant on said member at all times while said member is moving from the outlet port to the inlet port.

11. A lubricating system for machine bearings, comprising a lubricant reservoir, connections including a branched conduit from the reservoir to bearings to be lubricated, mechanism for intermittently producing and relieving pressure on the lubricant in the conduit, and valve means adjacent said bearings for controlling the quantity of lubricant supplied thereto, each of said valve means including a valve chamber having an inlet port, a valve member closing said inlet port when the pressure in said connections is low, and moved from said inlet port upon increase in said pressure, said mechanism including means independent of said valve means permitting leakage from said connections during the time said valve members are away from their respective inlet ports and until after said valve members have closed their respective inlet ports.

12. In a lubricating system for machine bearings, a conduit, means for increasing and decreasing pressure on the lubricant in said conduit, and measuring valves connected to said conduit each comprising a valve body having a chamber therein, an inlet port and an outlet port in said chamber, a member in said chamber arranged to move between the inlet port and the outlet port and to form a valve to close said ports alternately with each increase and decrease of pressure on the lubricant in said conduit, said pressure increasing and decreasing means including means independent of said measuring valves permitting leakage from said conduit to insure prompt return of each of said valve members to its respective inlet port upon decrease in pressure.

13. A lubricating system for machine bearings comprising a lubricant reservoir, connections including a conduit from the reservoir to a bearing to be lubricated, mechanism for intermittently producing and relieving pressure on the lubricant in the conduit, said mechanism including means permitting leakage of lubricant from said connections, and a measuring valve adjacent said bearing for controlling the quantity of lubricant supplied thereto.

14. A lubricating system for machine bearings comprising a lubricant reservoir, a plurality of bearings to be lubricated, connections between said reservoir and said bearings, mechanism for intermittently increasing the pressure on the lubricant in said connections, pressure relieving means permitting a slow leakage of lubricant from said connections, and a plurality of measuring valves adjacent said bearings and adapted to be operated upon successively increasing and relieving the lubricant pressure in said connections.

15. A lubricating system comprising a reservoir, bearings to be lubricated and automatically operable measuring valves adjacent said bearings, pump means for intermittently raising the pressure of the lubricant supplied to said measuring valves, and means for relieving the lubricant pressure at said measuring valves by permitting slow leakage of lubricant from a point intermediate the measuring valves and the reservoir.

16. A central lubricating system for the chassis bearings of an automobile comprising an oil reservoir, an engine driven pump adapted to draw oil from said reservoir, a pressure chamber adapted to receive oil from said pump, an engine driven outlet valve for said pressure chamber, a branched conduit system adapted to intermittently receive oil under pressure from the discharge valve and convey it to points near the chassis bearings, measuring devices in the conduit at each bearing including a valve adapted to be moved against spring pressure by the lubricant to cut off the flow of lubricant through said devices after a predetermined quantity has been delivered and to be held in closed position during the maintenance of pressure in the branched conduit, and means for relieving the pressure in the branched conduit comprising a valve controlled conduit for returning excess lubricant to the reservoir.

17. A lubricating system for machine bearings comprising a lubricant reservoir, a conduit system having branches leading to a plurality of bearings requiring lubrication, metering devices in said branches adjacent said bearings, said metering devices including valve means normally maintaining said conduit system filled with oil, a pump for intermittently supplying charges of lubricant to said conduit system, a pipe connecting said reservoir with said conduit system at a point between said pump and said metering devices, and means in said pipe affording a restricted passageway of such size that the pressure created in said conduit system by said pump is sustained only while said pump is operating to force lubricant into said conduit system.

18. A lubricating system for machine bearings comprising, in combination, a lubricant reservoir under substantially atmospheric pressure, connections including a branched conduit leading from the reservoir to bearings requiring lubrication, a pump supplied from said reservoir and adapted to produce pressure on the lubricant in the conduit, metering means in the conduit branches adjacent said bearings, and means connecting said reservoir with said conduit at a point intermediate said pump and said metering means, said connecting means having a restricted opening for controlling flow of lubricant from said conduit back to said reservoir under the pressure created in said conduit by said pump.

In witness whereof, I hereunto subscribe my name on this 6th day of June, 1927.

SYLVANUS D. LOCKE.

In witness whereof, I hereunto subscribe my name on this 6th day of June, 1927.

CHARLES R. DOSCH.